United States Patent
Oh et al.

(10) Patent No.: US 7,826,415 B2
(45) Date of Patent: Nov. 2, 2010

(54) APPARATUS AND METHOD FOR ALLOCATING FREQUENCIES IN AN OFDM MOBILE COMMUNICATION SYSTEM SUPPORTING HIGH SPEED DOWNLINK PACKET ACCESS SERVICE

(75) Inventors: Hyun-Seok Oh, Incheon (KR); Kwang-Man Ok, Yongin-si (KR); Sang-Hyo Kim, Suwon-si (KR); Min-Goo Kim, Yongin-si (KR); Su-Jin Yoon, Suwon-si (KR)

(73) Assignee: Qualcomm Incorporated, San Diego, CA (US)

( * ) Notice: Subject to any disclaimer, the term of this patent is extended or adjusted under 35 U.S.C. 154(b) by 329 days.

(21) Appl. No.: 11/202,091

(22) Filed: Aug. 12, 2005

(65) Prior Publication Data

US 2006/0039318 A1 Feb. 23, 2006

(30) Foreign Application Priority Data

Aug. 17, 2004 (KR) ............. 10-2004-0064897

(51) Int. Cl.
*H04W 4/00* (2009.01)
(52) U.S. Cl. ............. 370/329; 455/450; 455/464
(58) Field of Classification Search ......... 455/450, 455/451, 452.1, 452.2, 453, 464, 504, 505, 455/45, 506, 509, 512, 513; 370/347, 329, 370/330, 341, 395.4, 395.41–395.43, 431, 370/468
See application file for complete search history.

(56) References Cited

U.S. PATENT DOCUMENTS

| | | | | |
|---|---|---|---|---|
| 7,020,110 | B2 * | 3/2006 | Walton et al. | 370/334 |
| 2004/0008648 | A1 * | 1/2004 | Schmidl et al. | 370/335 |
| 2007/0183335 | A1 * | 8/2007 | Pietraski et al. | 370/241 |

FOREIGN PATENT DOCUMENTS

| | | |
|---|---|---|
| JP | 05-259969 | 10/1993 |
| JP | 06-069859 | 3/1994 |

(Continued)

OTHER PUBLICATIONS

Huawei "Time-Frequency Mapping of OFDM Units for Full Frequent Reuse Without Resource Planning" R1-030799. 3GPP TSG RAN WG1 #33; New York, NY, USA; Aug. 25-29, 2003.

(Continued)

*Primary Examiner*—Rafael Pérez-Gutiérrez
*Assistant Examiner*—Marcos Batista
(74) *Attorney, Agent, or Firm*—McDermott Will & Emery LLP

(57) ABSTRACT

An apparatus and method for allocating a frequency resource to a user equipment (UE) in an orthogonal frequency division multiplexing (OFDM) mobile communication system. A base station receives feedback information including at least mobility information from the UE, and determines from the mobility information whether the UE belongs to a fast group or a slow group. The base station allocates a frequency resource for the UE according to an open-loop solution if the UE belongs to the fast group, allocates a frequency resource for the UE according to a closed-loop solution if the UE belongs to the slow group, and transmits data for the UE using the allocated frequency resource.

20 Claims, 11 Drawing Sheets

FOREIGN PATENT DOCUMENTS

| | | |
|---|---|---|
| JP | 08-047035 | 2/1996 |
| JP | 2003-070055 | 3/2003 |
| JP | 2004-153585 | 5/2004 |
| WO | WO 0249306 | 6/2002 |
| WO | WO 03/032586 A1 | 4/2003 |
| WO | WO 2004004173 | 1/2004 |
| WO | WO 2004-056022 | 7/2004 |
| WO | WO 2005096538 | 10/2005 |

OTHER PUBLICATIONS

Search Report from related European Patent Application No. 05017860.7, dated Jan. 18, 2010.

* cited by examiner

APPARATUS AND METHOD FOR ALLOCATING FREQUENCIES IN AN OFDM MOBILE COMMUNICATION SYSTEM SUPPORTING HIGH SPEED DOWNLINK PACKET ACCESS SERVICE

PRIORITY

This application claims the benefit under 35 U.S.C. §119 (a) of an application entitled "Apparatus and Method for Allocating Frequencies in an OFDM Mobile Communication System Supporting High Speed Downlink Packet Access Service" filed in the Korean Intellectual Property Office on Aug. 17, 2004 and assigned Serial No. 2004-64897, the entire contents of which are incorporated herein by reference.

BACKGROUND OF THE INVENTION

1. Field of the Invention

The present invention relates generally to an Orthogonal Frequency Division Multiplexing (OFDM) communication system. In particular, the present invention relates to an apparatus and method for allocating frequency resources by taking mobility of a user equipment (UE) into account to support High Speed Downlink Packet Access (HSDPA) service.

2. Description of the Related Art

With the recent development of various content for mobile communication service, there is an increasing demand for multimedia service such as video, audio, text and digital broadcasting, as well as voice service. To meet the demand, research is being conducted on Orthogonal Frequency Division Multiplexing (OFDM), which is a conventional radio access technology for efficiently transmitting high-speed data. OFDM is a typical technology for the $4^{th}$, or later, generation mobile communication system, and research into and standardization on ultra-high speed packet transmission technologies are being actively performed worldwide.

OFDM technology provides high frequency efficiency with the use of multiple orthogonal subcarriers, and ensures high-speed data processing with the use of an inverse fast Fourier transform (IFFT) block and a fast Fourier transform (FFT) block. In the OFDM scheme, transmission is performed per OFDM symbol, and current transmission symbols may occasionally be affected by previous transmission symbols in a multipath environment. To prevent interference between OFDM symbols, the OFDM scheme uses a cyclic prefix (CP) to provide robustness against symbol interference and fading in the multipath channel environment. Advantageously, the OFDM scheme is simply extensible to multiuser and multiantenna systems.

In this context, $3^{rd}$ Generation Partnership Project (3GPP) Rel6 (Release 6) provide use of the OFDM scheme for downlink transmission of high-speed packet data. That is, the OFDM scheme is used for supporting High Speed Downlink Packet Access (HSDPA) service. In this case, to transmit downlink OFDM signals, a base station includes a function of converting frequency-domain signals into time-domain signals using IFFT, a function of modulating data carried on the OFDM signals, and a function of processing a radio frequency (RF) related to transmission of the OFDM signals.

FIG. 1 illustrates a conventional structure of a base station transmitter proposed in 3GPP Rel6.

Referring to FIG. 1, a base station supporting HSDPA provides a high speed-downlink shared channel (HS-DSCH) for data transmission, and a high speed-shared control channel (HS-SCCH) for carrying control information needed for demodulation of the HS-DSCH. For example, the HS-SCCH carries channelization code set (CCS) information indicating the number of codes, through which the HS-DSCH has been transmitted. In the current standard, a maximum of 15 channelization codes can be used for transmission of the HS-DSCH.

HS-DSCH data for HSDPA and HS-SCCH information including control information and pilot information are mapped to Quadrature Amplitude Modulation (QAM) signals in QAM mappers 100 and 102, respectively. A physical channel (PHY_CH) mapping and multiplexing block 104 maps the QAM signals to subcarriers for data transmission and subcarriers for control information transmission, and then multiplexes the mapped subcarriers. An IFFT block 106 performs IFFT, i.e., OFDM modulation, on the N multiplexed subcarrier signals, and outputs an OFDM symbol comprised of N OFDM samples.

A guard interval inserter 108 inserts a prefix or a suffix in the OFDM symbol comprised of N OFDM samples. For example, the guard interval inserter 108 copies the last G OFDM samples (copied sample data) among the OFDM samples and inserts the copied sample data in the front of the OFDM symbol. Herein, the OFDM symbol, in the front of which a prefix or a suffix is inserted, will be referred to as an "OFDM transmission symbol." An OFDM transmission symbol output from the guard interval inserter 108 is separated into an in-phase (I) channel and a quadrature-phase (Q) channel, and converted into an analog OFDM signal by a digital-to-analog converter (DAC) 110. The OFDM signal is converted into a radio frequency (RF) signal by a RF unit 112 and then transmitted through an antenna 114.

Reception performance of the OFDM signal depends considerably on the mobility of a UE receiving the OFDM signal. This is because a radio channel changes characteristics according to movement and location of the UE.

If a moving velocity of the UE becomes higher than or equal to a threshold velocity increasing a Doppler effect, the channel quality of the UE is subject to frequent variation, so that the base station cannot normally transmit downlink packet data. That is, the conventional system allocates radio resources for data transmission without considering the mobility of UEs, causing deterioration of the entire system performance.

SUMMARY OF THE INVENTION

To solve the above problems, therefore, exemplary embodiments of the present invention provide an apparatus and method for allocating radio resources according to mobility of user equipments (UEs) in an Orthogonal Frequency Division Multiplexing (OFDM) mobile communication system.

The exemplary embodiments of the present invention provide an apparatus and method for allocating radio resources to fast UEs and slow UEs separately in an OFDM mobile communication system.

The exemplary embodiments of the present invention provide an apparatus and method for maximizing quality of service (QoS) by servicing fast UEs and slow UEs separately in an OFDM mobile communication system.

The exemplary embodiments of the present invention provide an apparatus and method for feeding back mobility information of UEs to a base station in an OFDM mobile communication system.

According to one exemplary aspect of the present invention, there is provided a method for allocating, by a base station, a frequency resource to a user equipment (UE) in an orthogonal frequency division multiplexing (OFDM) mobile communication system. The method comprises the steps of receiving feedback information comprising at least mobility information from the UE; determining from the mobility information whether the UE belongs to a fast group or a slow group, allocating a frequency resource for the UE according to an open-loop solution if the UE belongs to the fast group, and allocating a frequency resource for the UE according to a closed-loop solution if the UE belongs to the slow group; and transmitting data for the UE using the allocated frequency resource.

According to another exemplary aspect of the present invention, there is provided a method for receiving an allocated frequency resource for receiving high-speed downlink packet data in an orthogonal frequency division multiplexing (OFDM) mobile communication system. The method comprises the steps of measuring channel quality per frequency using an OFDM signal received from a base station through multiple subcarrier channels; measuring mobility of a user equipment (UE) that receives the OFDM signal; determining whether the UE moves at high speed according to the measured mobility; if the UE moves at high speed, including mobility information indicating the measured mobility in feedback information, and transmitting the feedback information to the base station; and if the UE does not move at high speed, including mobility information indicating the measured mobility and channel information indicating the channel quality in feedback information, and transmitting the feedback information to the base station.

According to further another exemplary aspect of the present invention, there is provided a base station apparatus for allocating a frequency resource to a user equipment (UE) in an orthogonal frequency division multiplexing (OFDM) mobile communication system. The apparatus comprises a resource allocator for receiving feedback information comprising at least mobility information from the UE, determining from the mobility information whether the UE belongs to a fast group or a slow group, allocating a frequency resource for the UE according to an open-loop solution if the UE belongs to the fast group, allocating a frequency resource for the UE according to a closed-loop solution if the UE belongs to the slow group, and determining a mapping pattern indicating the allocated frequency resource; and a transmitter for mapping data for the UE to the allocated frequency resource according to the mapping pattern provided from the resource allocator and transmitting the data for the UE.

According to still another exemplary aspect of the present invention, there is provided a user equipment (UE) apparatus for receiving an allocated frequency resource for receiving high-speed downlink packet data in an orthogonal frequency division multiplexing (OFDM) mobile communication system. The apparatus comprises a channel measurer for measuring channel quality per frequency using an OFDM signal received from a base station through multiple subcarrier channels; a mobility measurer for measuring mobility of the UE; a feedback information generator for determining whether the UE moves at high speed according to the measured mobility, including mobility information indicating the measured mobility in feedback information if the UE moves at high speed; and including the mobility information and channel information in the feedback information if the UE does not move at high speed; and a transmitter for transmitting the feedback information to the base station.

BRIEF DESCRIPTION OF THE DRAWINGS

The above and other objects, features and advantages of the present invention will become more apparent from the following detailed description when taken in conjunction with the accompanying drawings in which.

Throughout the drawings, the same or similar elements, features and structures are represented by the same reference numerals.

DETAILED DESCRIPTION OF EXEMPLARY EMBODIMENTS

Figure 1:
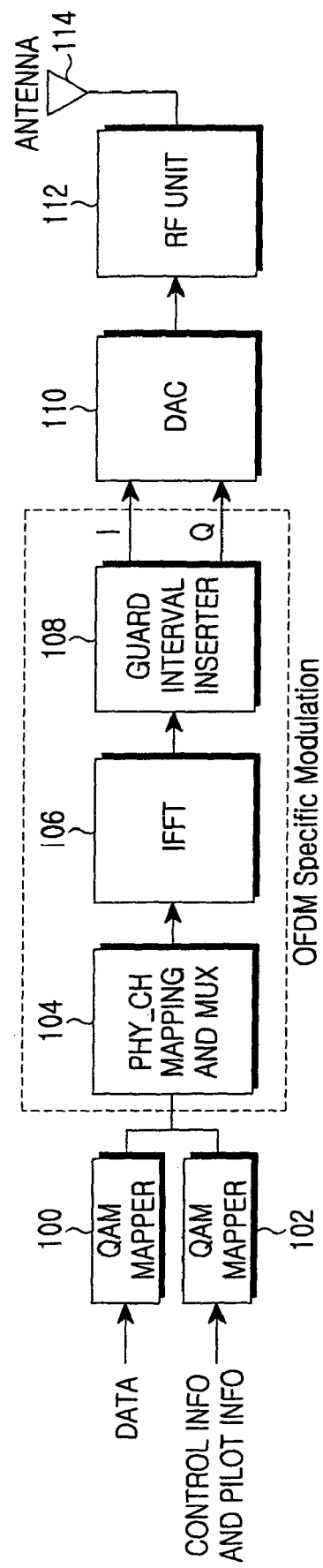
FIG. 1 is a diagram illustrating a conventional structure of a base station transmitter.

Exemplary embodiments of the present invention will now be described in detail with reference to the accompanying drawings. In the following description, a detailed description of known functions and configurations incorporated herein has been omitted for conciseness.

In an embodiment of the present invention, in an Orthogonal Frequency Division Multiplexing (OFDM) mobile communication system supporting High Speed Downlink Packet Access (HSDPA) service, a base station allocates radio resources, especially, frequency resources, taking mobility of a user equipment (UE) into consideration, thereby guaranteeing the quality of service (QoS) of a plurality of UEs moving at different speeds in the same cell.

In the process of transmitting high-speed packet data to UEs, the base station allocates frequency resources through a Doppler effect of each UE to satisfy required QoS of each UE. The base station allocates frequency resources using an open-loop solution and a closed-loop solution according to a Doppler value (i.e., Doppler frequency) of each UE.

More specifically, the base station acquires a moving velocity or a Doppler value of each UE, and if the velocity/Doppler value is greater than or equal to a predetermined threshold, the base station uses a resource allocation solution set for a fast UE group, that is appropriate for a higher channel variation rate. If the velocity/Doppler value is less than the threshold, the base station uses a resource allocation solution set for a slow UE group, that is appropriate for a lower channel variation rate. There is a difference between the possible QoS provided to UEs in a stationary state or moving at very low speed and the possible QoS provided to UEs moving at high speed (for example, 30 Km/h or higher). Therefore, the base station uses a resource allocation solution capable of maximizing transmission efficiency of UEs taking into account channel environments of the UEs having different speeds of mobility.

Herein, it will be assumed that High Speed Downlink Packet Access (HSDPA) channels applied to the OFDM system are equal or substantially equal to each other in structure before modulation symbols are mapped to a physical channel. In the following description, QAM symbols are used as the modulation symbols, by way of example. Channel multiplexing is achieved by mapping the channels to different OFDM time-frequency elements. A relationship between the time-frequency elements to which the channels are allocated is defined as a time-frequency pattern, and the multiplexing scheme should satisfy the following three particulars.

First, the multiplexing scheme should maximize a minimum distance between two random elements to which the channels are allocated in a time-frequency grid.

Second, the multiplexing scheme should minimize a normalized periodic Hamming correlation between two random time-frequency patterns.

Third, the multiplexing scheme should minimize a maximum sidelobe of a normalized periodic Hamming correlation between the time-frequency patterns.

The multiplexing scheme can obtain diversity gain using Space-Time Transmit Diversity (STTD) or Space-Frequency Transmit Diversity (SFTD). To obtain frequency diversity gain, the multiplexing scheme can also use frequency hopping or frequency interleaving.

Figure 2:
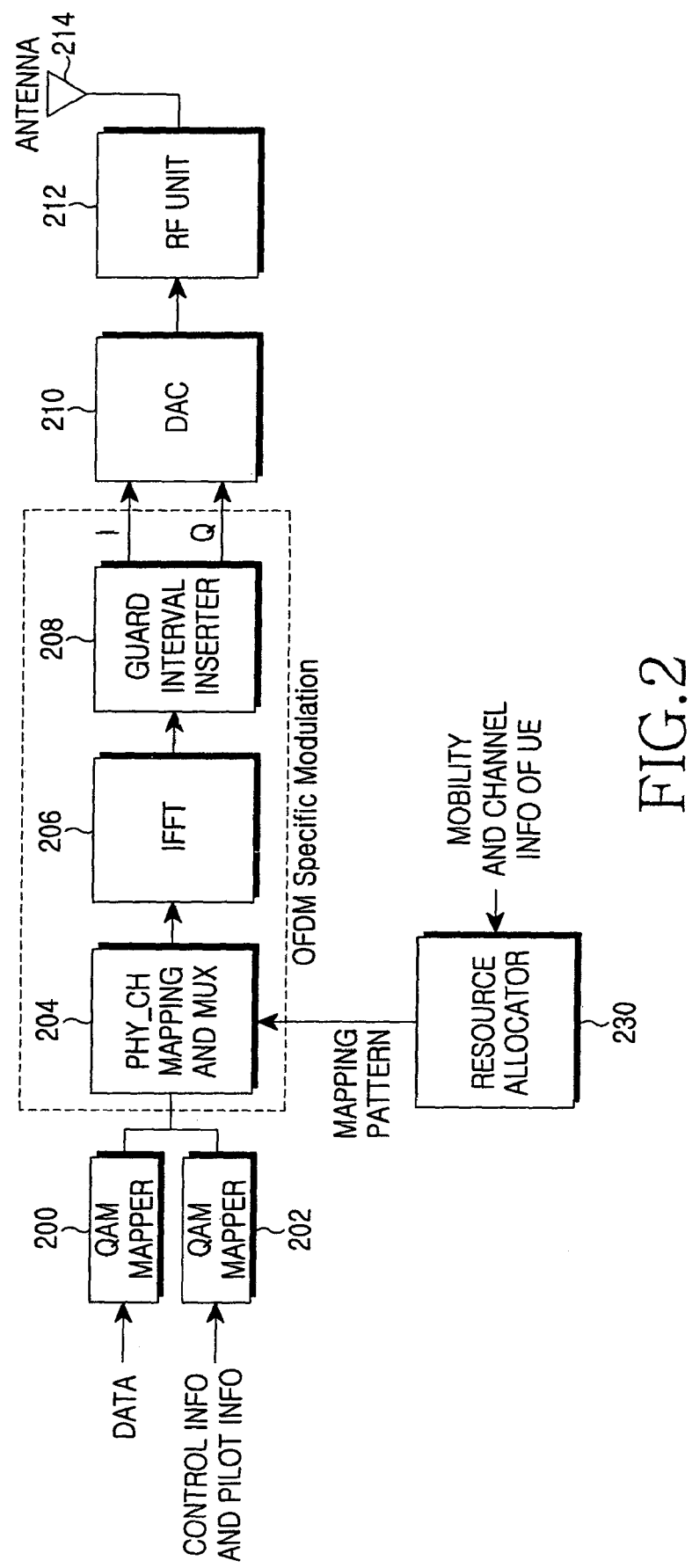
FIG. 2 is a diagram illustrating an exemplary structure of a base station transmitter for allocating radio resources according to an exemplary embodiment of the present invention.

FIG. 2 illustrates a structure of a base station transmitter according to an embodiment of the present invention.

Referring to FIG. 2, Quadrature Amplitude Modulation (QAM) mappers 200 and 202 map HS-DSCH data and HS-SCCH information comprising control information for demodulation of the HS-DSCH data and pilot information to QAM signals, respectively. The QAM signals are mapped to radio frequency resources allocated according to a mapping pattern provided from a resource allocator 230.

The resource allocator 230 determines a temporal, frequency or spatial mapping pattern appropriate for UEs, using feedback information from the UEs. A physical channel (PHY_CH) mapping and multiplexing block 204 maps channel data for a plurality of UEs supporting HSDPA to their corresponding subbands by considering a mapping pattern provided from the resource allocator 230, and multiplexes the subbands. Herein, the "subband" refers to a frequency resource unit comprised of one or more subcarriers.

An inverse fast Fourier transform (IFFT) block 206 converts the multiplexed signals into an OFDM symbol comprised of N OFDM samples. A guard interval inserter 208 inserts a prefix or a suffix in the OFDM symbol comprised of N OFDM samples. For example, the guard interval inserter 208 copies the last G OFDM samples from among the OFDM samples and inserts the copied samples in the front of the OFDM symbol. The OFDM transmission symbol output from the guard interval inserter 208 is separated into an I channel and a Q channel, and then converted into an analog OFDM signal by a digital-to-analog converter (DAC) 210. The OFDM signal is converted into a radio frequency (RF) signal by a RF unit 212 and then transmitted via an antenna 214.

The resource allocator 230 of the base station allocates frequency resources based on feedback information from UEs by considering the mobility of each of the UEs, and provides a mapping pattern indicating the allocated frequency resources to the physical channel mapping and multiplexing block 204. That is, the resource allocator 230 determines a mapping pattern appropriate for each of the UEs based on feedback information from the UEs taking temporal, frequency or spatial diversity into consideration.

Figure 3:
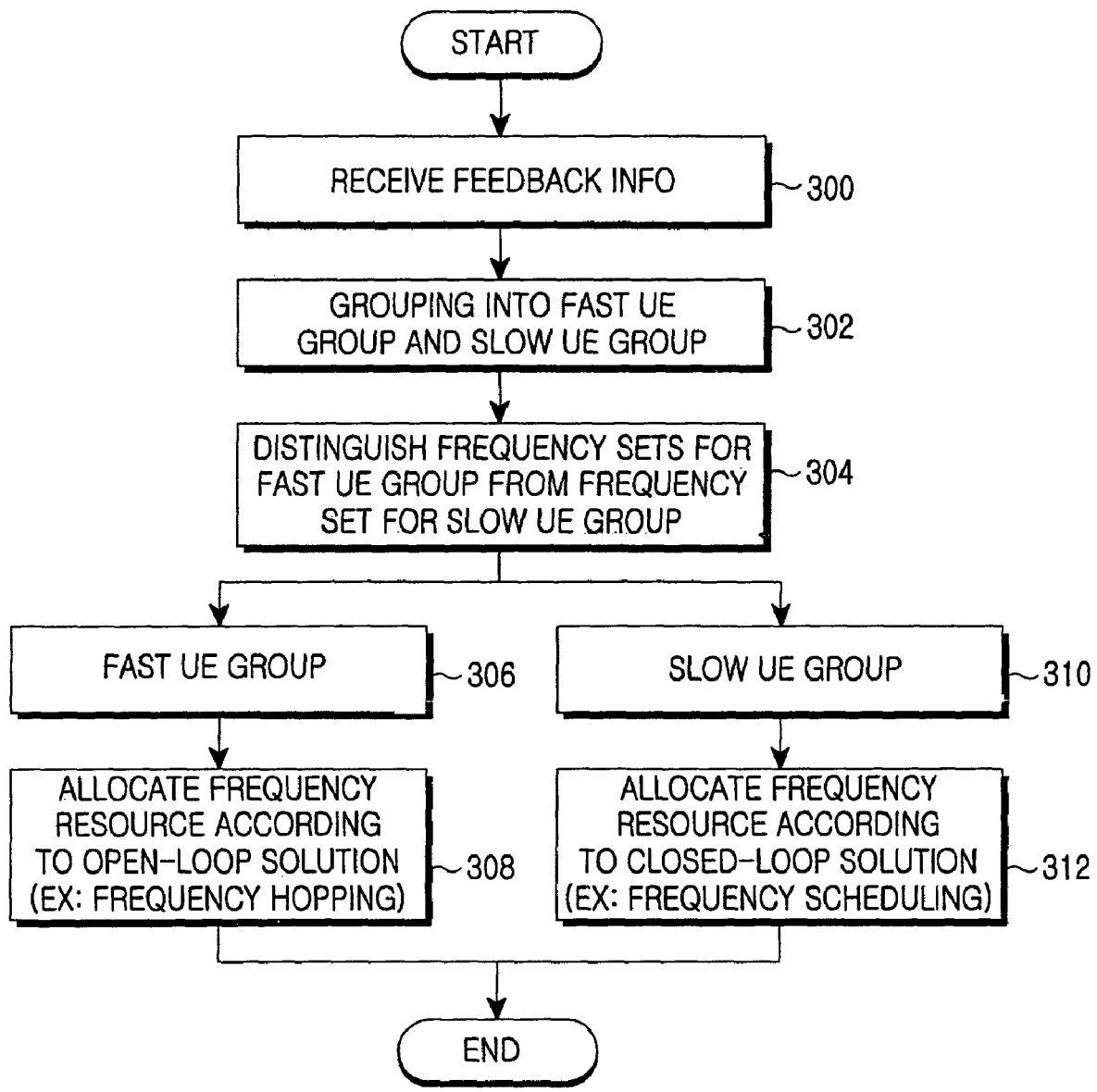
FIG. 3 is a flowchart illustrating an exemplary operation of allocating radio resources to fast user equipments (UEs) and slow UEs separately according to an embodiment of the present invention.

FIG. 3 is a flowchart illustrating an exemplary base station operation of allocating radio resources to fast UEs and slow UEs separately according to an exemplary embodiment of the present invention.

Referring to FIG. 3, a base station receives feedback information from a plurality of UEs in step 300. The feedback information can comprise mobility information indicating a velocity of each UE or a Doppler value corresponding to the moving velocity, and a channel quality indicator (CQI) for allocated frequency resources. Herein, the mobility information can comprise not only the velocity/Doppler value of each UE but also related information from which the velocity can be determined. The CQI indicates the signal quality for each subcarrier group (i.e., subband) when the available subcarriers of the base station are separated into subcarrier groups. In addition, the CQI includes Null/Peak information of allocated subcarriers or allocated subcarrier groups. The "Null" refers to a subcarrier/subband where no valid signal is detected, and the "Peak" refers to a subcarrier/subband where a signal with the peak strength is detected. The base station controls a feedback rate depending on the mobility information. That is, the base station individually controls a mobility reporting cycle and a CQI reporting cycle for each UE or controls a feedback cycle for which the feedback information is transmitted, taking the mobility information into account.

In step 302, the base station separates the UEs into a fast UE group and a slow UE group based on the received feedback information. In step 304, the base station determines the number of UEs in the fast UE group and the number of UEs in the slow UE group, and determines available frequency sets according thereto. In step 304, the base station determines frequency resources appropriate for the fast UE group and the slow UE group. The base station determines frequency resources using the following methods.

A first method takes priority into account. That is, the first method allocates a higher priority to the fast UE group and applies a Costas sequence, which is a 3GPP open-loop resource allocation solution, to the fast UE group. The Costas sequence specifies time-frequency resources, and a detailed description thereof will be made later. The fast UE group is allocated time-frequency elements according to a time-frequency mapping technique. The base station allocates the remaining time-frequency elements except for the time-frequency elements allocated to the fast UE group to the slow UE group. A detailed description of the first method will be made later with reference to FIG. 4A.

A second method divides the full frequency band into two parts based on the ratio of the number of fast UEs to the number of slow UEs. For example, it can be assumed that the available full frequency band has a total of 16 subbands #0 through #15, and the number of the fast UEs is double the number of the slow UEs. In this case, the base station allocates a lower frequency band, i.e., the subbands #0 through #10, for the fast UE group, and allocates a higher frequency band, i.e., the subbands #11 through #15, for the slow UE group. A detailed description of the second method will be made later with reference to FIG. 4B.

A third method obtains frequency diversity gain by applying the frequency interleaving technique to the second method. In this method, the base station allocates frequency sets such that subbands available for the fast UE group and subbands available for the slow UE group alternate with each other over the full frequency band. A size of each of the frequency sets is determined based on the ratio of the number of UEs in the fast UE groups to the number of UEs in the slow UE group. In addition, the base station allocates the frequency sets such that subbands for the fast UE group or the subbands for the slow UE group should not adjoin each other. A detailed description of the third method will be made later with reference to FIG. 4C.

A fourth method divides each of the subbands into the ratio of the number of UEs in the fast UE group to the number of UEs in the slow UE group. The method divides subcarriers constituting each of the subbands in the ratio of the number of UEs in the fast UE group to the number of UEs in the slow UE group, and separates a frequency band for the fast UE group from a frequency band for the slow UE group. A detailed description of the fourth method will be made later with reference to FIG. 4D.

Upon determining UEs belonging to the fast UE group in step 306, the base station allocates individual frequency resources to the UEs in the fast UE group using an open-loop solution in step 308. That is, the base station allocates frequency resources within the frequency set allocated for the fast UE group according to the open-loop solution, such as Costas sequence-based time-frequency mapping, STTD, SFTD, frequency hopping, and frequency interleaving. Therefore, the base station does not require the channel information of UEs in the fast UE group when allocating frequency resources for the fast UE group. In addition, the base station can select a modulation scheme and a coding rate according to an average signal-to-interference ratio (SIR) for individual subbands of UEs in the fast UE group.

Upon determining UEs belonging to the slow UE group in step 310, the base station allocates, in step 312, individual frequency resources to the UEs in the slow UE group within the frequency set allocated for the slow UE group according to a closed-loop solution. In this case, the base station uses not only the mobility information of the UEs in the slow UE group but also channel information such as the Null/Peak information. For example, the base station performs frequency scheduling using channel information for the Null such that a subband corresponding to the Null is not allocated to the corresponding UE.

This is because frequency allocation for the slow UE group having a lower channel variation rate is performed after frequency allocation for the fast UE group is performed. In this case, the base station analyzes Null/Peak information transmitted from the UEs in the slow UE group and performs frequency scheduling according to the Null/Peak information to allocate the best frequency resources, such that a subband corresponding to the Peak of the slow UE group is allocated for the fast UE group or a subband corresponding to the Null is not allocated for the slow UE group.

In addition, the base station can adjust the feedback cycle and the type of the feedback information according to the feedback information transmitted from the UEs through uplink channels.

As described above, the base station distinguishes between the fast UE group and the slow UE group, and then allocates frequency resources to a corresponding UE group using an appropriate frequency allocation algorithm. The base station uses an open-loop algorithm for the fast UE group and a closed-loop algorithm for the slow UE group. In this manner, the base station maximizes the entire performance of the mobile communication system in which the fast UEs and the slow UEs coexist, and efficiently supports HSDPA using the OFDM scheme.

FIGS. 4A through 4D illustrate exemplary embodiments in which a base station allocates frequency resources to a fast UE group and a slow UE group in as shown in FIG. 3 in accordance with an exemplary embodiment of the present invention. In FIGS. 4A to 4D, a horizontal axis represents subbands of the full frequency band, and a vertical axis represents OFDM symbol intervals of the full OFDM frame. Therefore, each block represents a time-frequency element, which is a combination of a subband and a OFDM symbol interval.

Figure 4A:
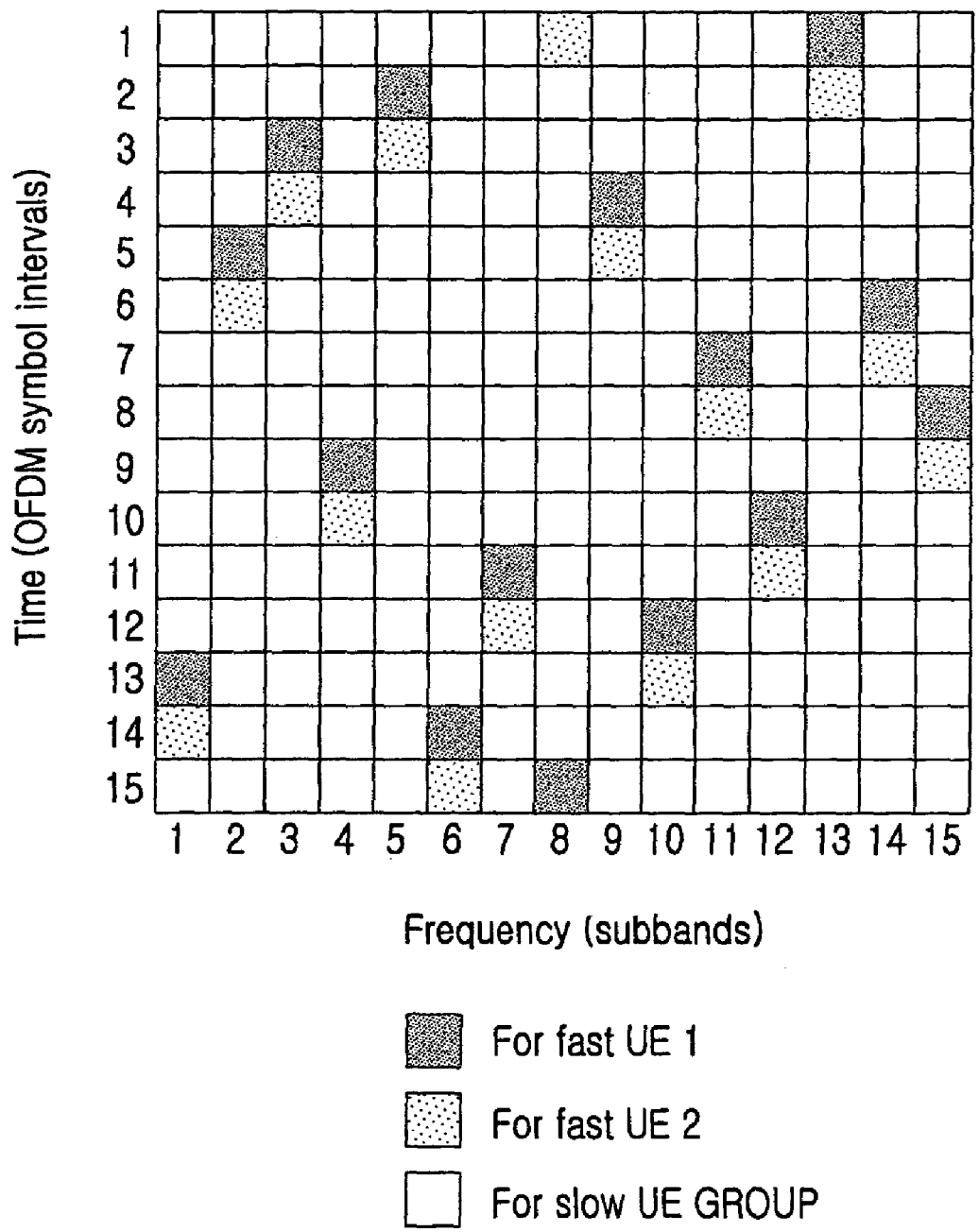
FIGS. 4A through 4D are diagrams exemplary illustrating radio resource allocation methods according to exemplary embodiments of the present invention.

FIG. 4A illustrates a mapping pattern for the method of allocating frequency resources by taking priority into account. The method allocates a frequency to the fast UE group using a time-frequency mapping pattern. In this method, a base station allocates a higher priority to the fast UE group and allocates a frequency to the fast UE group using a Costas sequence. The Costas sequence is a mapping pattern representing a time-frequency element allocated according to the time-frequency mapping technique. When the number of OFDM symbols (time axis) is equal to the number of subbands (frequency axis), i.e., when the time axis is comprised of 15 symbol intervals and the number of the subbands is 15, a mapping pattern representing the allocated time-frequency elements is as follows.

Costas sequence #0=[13, 5, 3, 9, 2, 14, 11, 15, 4, 12, 7, 10, 1, 6, 8]

The Costas sequence #0 is a mapping pattern used for creating a $1^{st}$ channel. The Costas sequence #0 indicates that a $0^{th}$ channel is created by a $13^{th}$ symbol interval of a $1^{st}$ subband, a $5^{th}$ symbol interval of a $2^{nd}$ subband, a $3^{rd}$ symbol interval of a $3^{rd}$ subband, and so forth. To provide an additional channel, a Costas sequence #1 is created by shifting the subbands indicated by the Costas sequence #0 along the frequency axis one by one, as follows.

Costas sequence #1=[14, 6, 4, 10, 3, 15, 12, 0, 5, 13, 8, 11, 2, 7, 9]

Similarly, the Costas sequence #1 indicates that a $2^{nd}$ channel is created by a $14^{th}$ symbol interval of the $1^{st}$ subband, a $6^{th}$ symbol interval of the $2^{nd}$ subband, a $4^{th}$ symbol interval of the $3^{rd}$ subband, and so forth. As described above, it is assumed in FIG. 4A that there are three UEs in a cell managed by the base station, a UE1 and a UE2 are fast UEs, and a UE3 is a slow UE.

The UE1 is allocated time-frequency elements of [13, 5, 3, 9, 2, 14, 11, 15, 4, 12, 7, 10, 1, 6, 8] according to the Costas sequence #0. The UE2 is allocated time-frequency elements of [14, 6, 4, 10, 3, 15, 12, 0, 5, 13, 8, 11, 2, 7, 9] obtained by shifting the subbands of the Costas sequence #0 along the frequency axis one by one.

However, the UE3, which is a slow UE, is allocated resources among the remaining resources except for the time-frequency resources allocated to the fast UE group, taking the corresponding feedback information into account. In this case, the base station allocates the resources such that the frequency mapped to the Null and the frequencies allocated to the UE1 and the UE2 should not be allocated to the UE3 according to the feedback information.

The frequency allocation method of FIG. 4A can provide flexible frequency allocation for the fast UEs. However, because the slow UEs must be allocated the remaining frequencies except for the Null frequency and the frequencies allocated to the UE1 and the UE2, the base station fails to allocate the best frequency resources to the slow UEs. Therefore, the base station allocates the second best frequencies to the slow UEs through frequency scheduling.

In other words, if the best subband for a slow UE overlaps the time-frequency element allocated for a fast UE, the slow UE cannot use the best subband and can use only the second best subband for as many symbol intervals as the number of fast UEs.

Figure 4B:
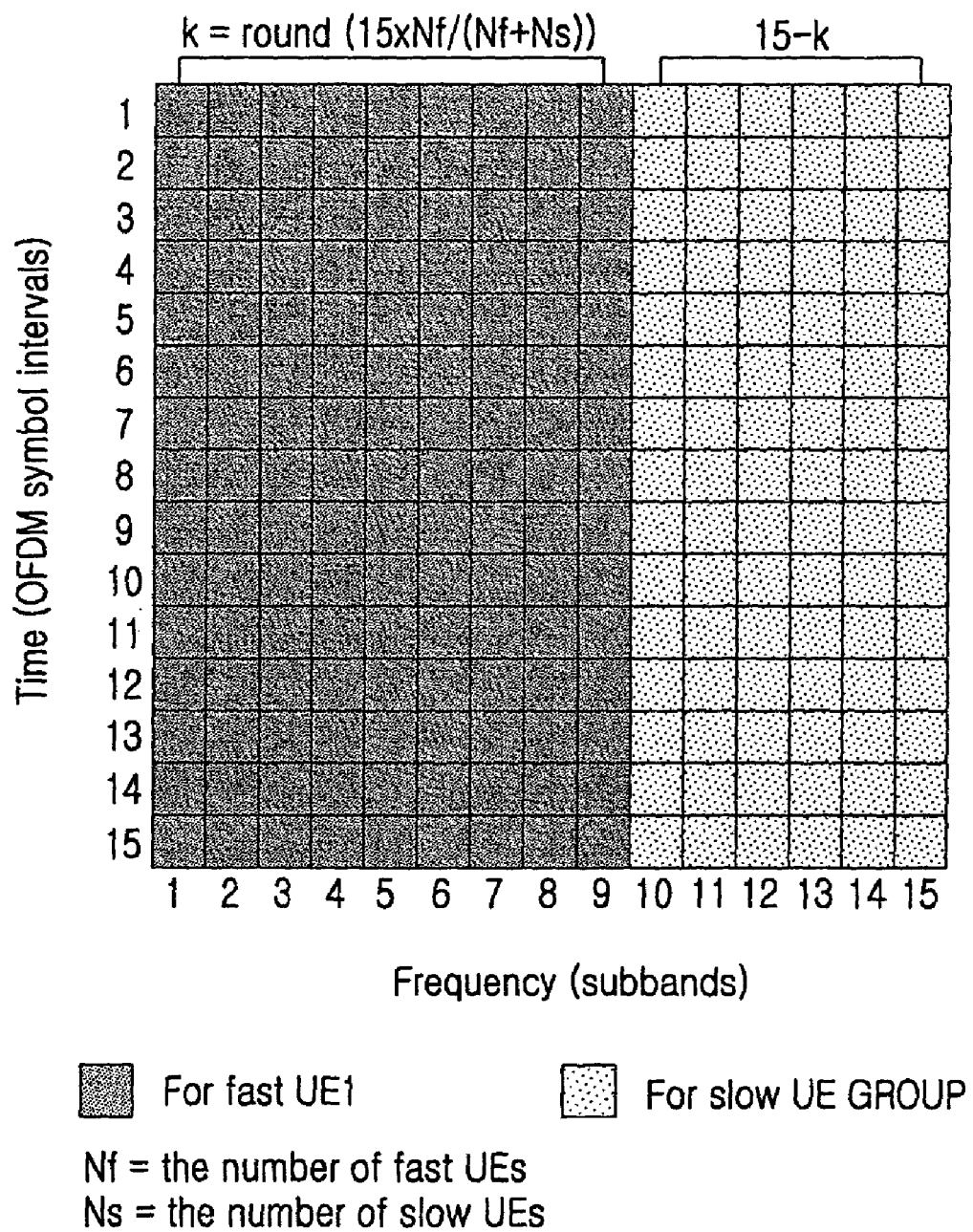

FIG. 4B illustrates the second method for dividing a full frequency band with a predetermined size in the ratio of the number of UEs in the fast UE group to the number of UEs in the slow UE group.

In FIG. 4B, a frequency set for the fast UE group is comprised of subbands #1 through #9 in the left hand side, and a frequency set for the slow UE group is comprised of subbands #10 through #15 in the right hand side. If the number of UEs in the fast UE group is given as Nf and the number of UEs in the slow UE group is given as Ns, the number k of subbands allocated to the fast UE group becomes a rounded value of 15*Nf/(Nf+Ns), and the number of subbands allocated to the slow UE group becomes 15−k.

Figure 4C:
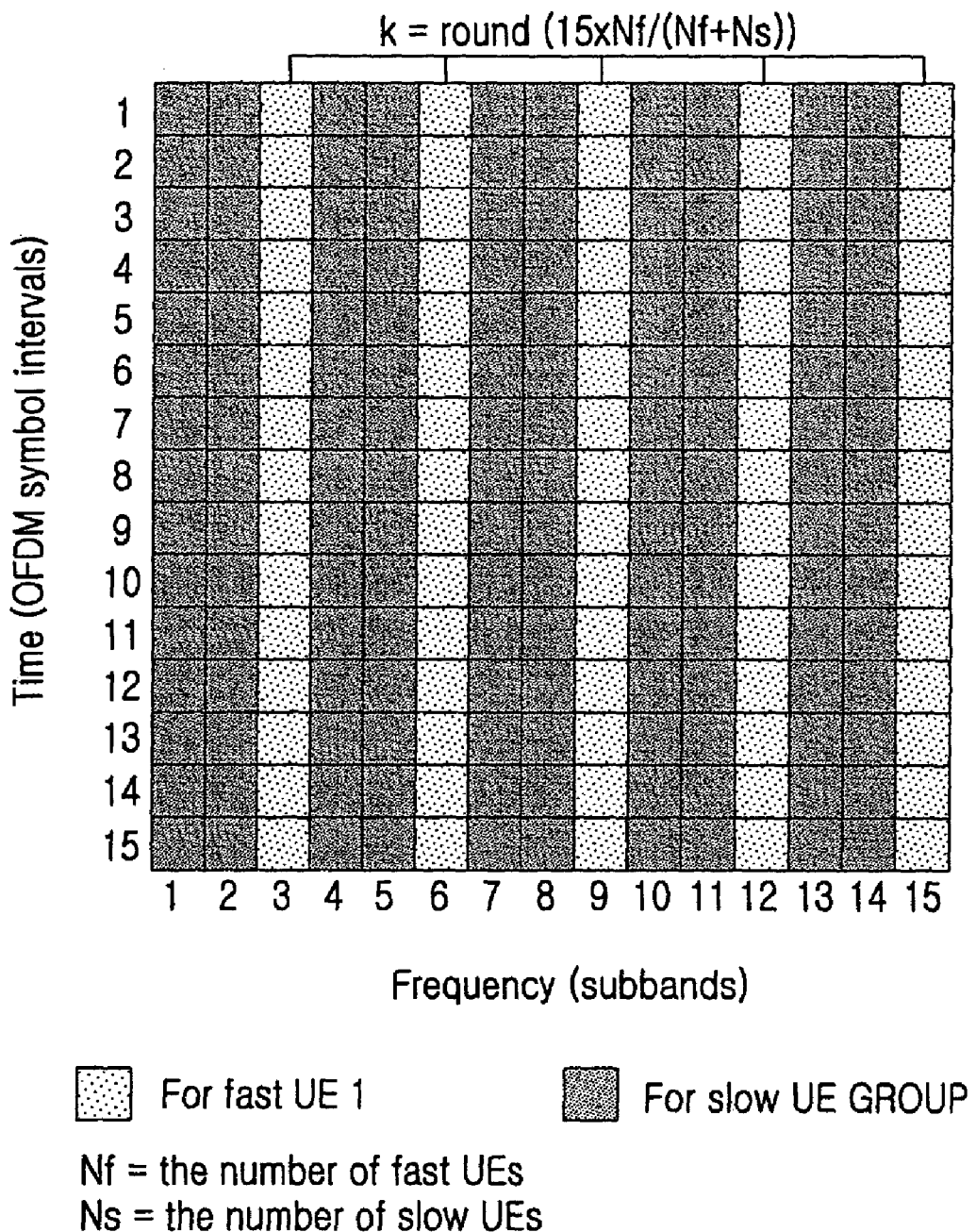

FIG. 4C illustrates the third method for allocating subbands for the fast UE group in such a manner than the subbands are maximally and periodically arranged over the full frequency band.

In FIG. 4C, because the number Nf of UEs in the fast UE group is less than the number Ns of UEs in the slow UE group, a frequency set allocated for the fast UE group is less than a frequency set allocated for the slow UE group. In this case, subbands for the fast UE groups do not adjoin each other, but are spaced apart to obtain a frequency diversity effect. That is, frequencies for the fast UE group and the frequencies for the slow UE group alternate with each other. Similarly, the number k of subbands allocated to the fast UE group becomes a rounded up value of 15*Nf/(Nf+Ns), and the number of subbands allocated to the slow UE group becomes 15−k.

Figure 4D:
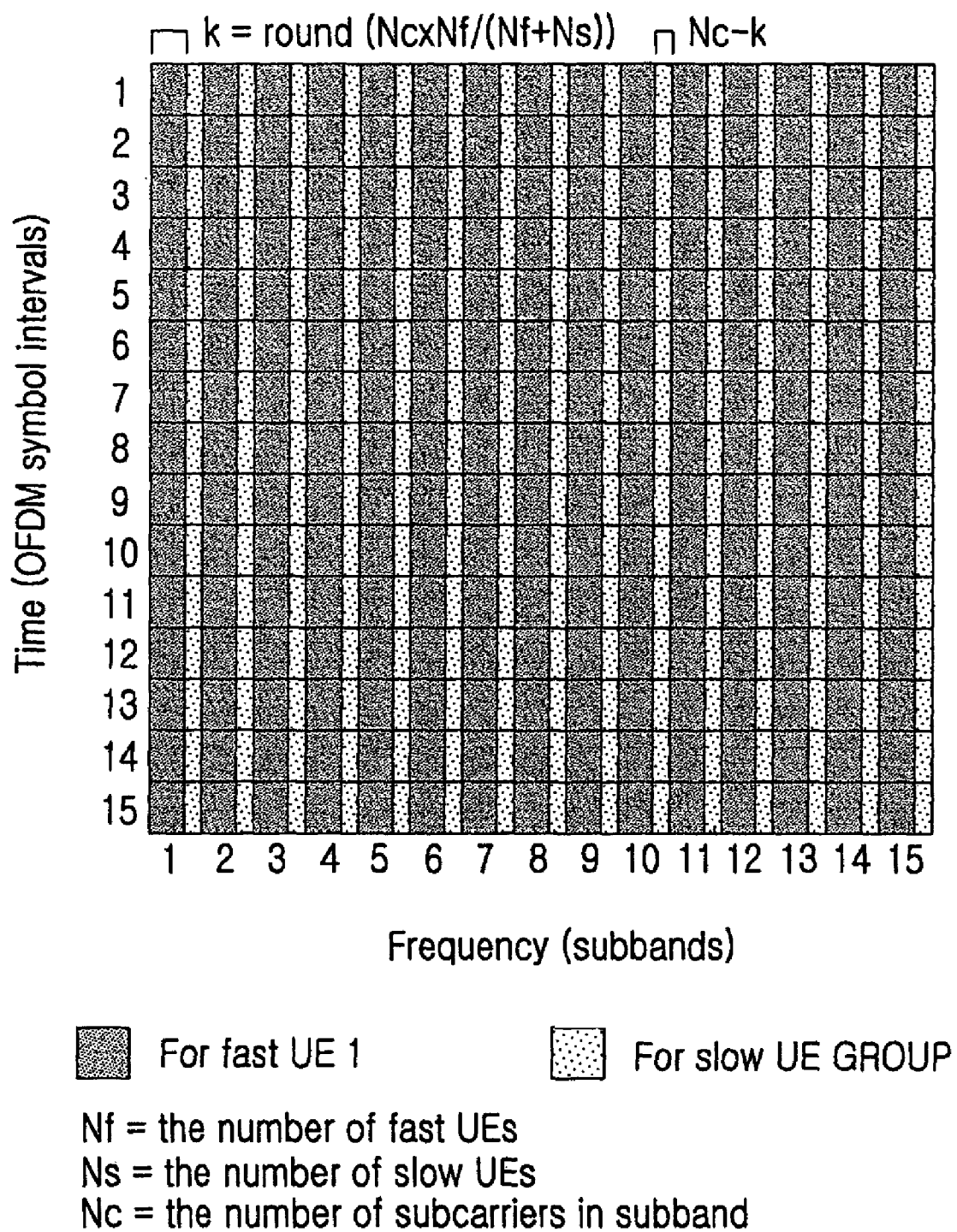

FIG. 4D illustrates the fourth method for allocating a plurality of subcarriers constituting one subband to the fast UE group and the slow UE group.

Referring to FIG. 4D, each of the subbands is comprised of at least one subcarrier for the fast UE group and at least one subcarrier for the slow UE group. The UEs in the fast UE group can be allocated frequency resources using the Costas sequence-based time-frequency mapping technique or the frequency hopping technique. The UEs in the slow UE group can be allocated frequency resources using feedback information.

If the number of UEs in the fast UE group is Nf, the number of UEs in the slow UE group is Ns, and each subband is comprised of Nc subcarriers, the number k of subcarriers allocated to the fast UE group in each subband becomes a rounded up value of Nc*Nf/(Nf+Ns). For example, if the fast UE group requires more frequency resources, the base station divides each subband comprised of Nc subcarriers into round (Nc/(Nc−k)) frequency units, allocates one frequency unit of each subband to the slow UE group, combines the remaining frequency units of each subband, and allocates the combined frequency unit to the fast UE.

Figure 5:
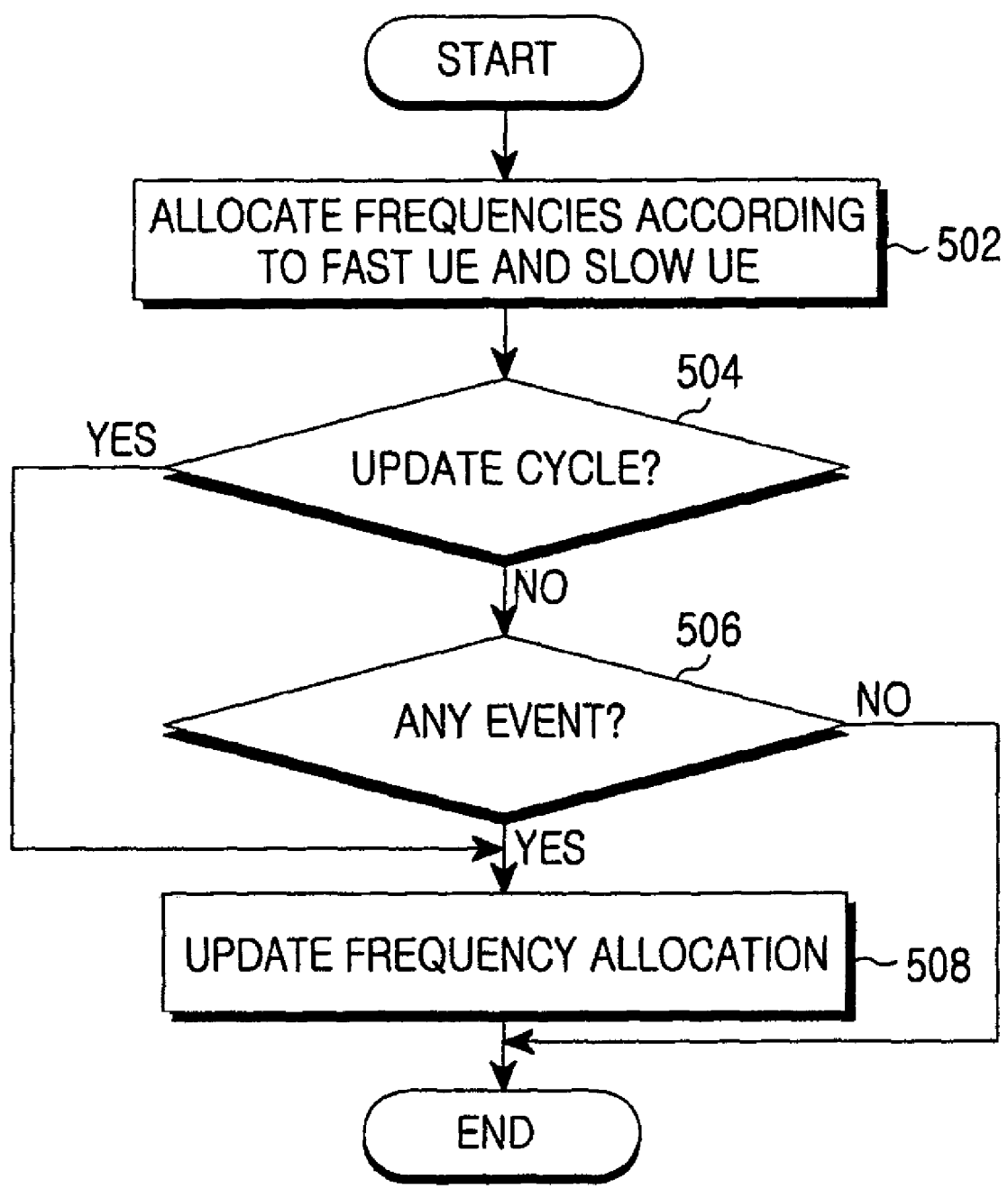
FIG. 5 is a flowchart illustrating an exemplary base station operation for updating allocated radio resources according to an exemplary embodiment of the present invention.

FIG. 5 is a flowchart illustrating an exemplary base station operation of updating allocated radio resources according to an exemplary embodiment of the present invention.

Referring to FIG. 5, in step 502, a base station classifies UEs located in its cell into a fast UE group and a slow UE group depending on feedback information from the UEs. The base station allocates frequency resources taking into account the number of UEs in the fast UE group and the number of UEs in the slow UE group. The base station uses an algorithm optimized in terms of mobility of UEs when allocating appropriate frequencies to the UEs in the fast UE group and the slow UE group.

For example, in step 502, the base station allocates time-frequency elements to the UEs in the fast UE group according to a time-frequency mapping pattern using the Costas sequence. That is, UEs receiving OFDM signals transmitted according to the Costas sequence acquire a frequency diversity effect. However, the base station allocates the best subbands to the UEs in the slow UE group using feedback information from each UE, for example, Null/Peak or CQI.

In step 504, the base station determines if a radio resource allocation cycle for updating the allocated frequencies has arrived. The radio resource allocation cycle can be set by the base station taking the mobility of the UEs into consideration. If the radio resource allocation cycle has arrived, the base station proceeds to step 508. In step 508, the base station re-allocates frequency resources taking into account the number of UEs in the fast UE group and the number of UEs in the slow UE group. For the frequency allocation, the base station uses the foregoing frequency allocation methods.

However, if it is determined in step 504 that the radio resource allocation cycle has not arrived, the base station determines in step 506 whether any event occurred in a radio resource environment in the cell. That is, the base station determines whether a new UE has entered the current cell from another cell or the UE in the current cell has moved to another cell. Alternatively, the base station determines whether a UE in the fast UE group has moved to the slow UE group or a UE in the slow UE group has moved to the fast UE group.

Upon detecting the occurrence of the event, the base station proceeds to step 508 where it updates frequency allocation in the cell by taking into account group states of the UEs and the number of UEs in each group.

In order to perform rapid frequency allocation when a UE has moved to a group in which the UE is not included, the base station can allocate a minimum frequency even through there is no UE belonging to any one group as a result of analyzing the fast UE group and the slow UE group in the cell.

That is, in step 506, the base station can update frequency allocation according to a predetermined minimum event occurrence criterion instead of re-allocating frequency resources each time the event occurs. This is to prevent inefficient use of signaling between the base station and the UEs located in the cell.

Figure 6:
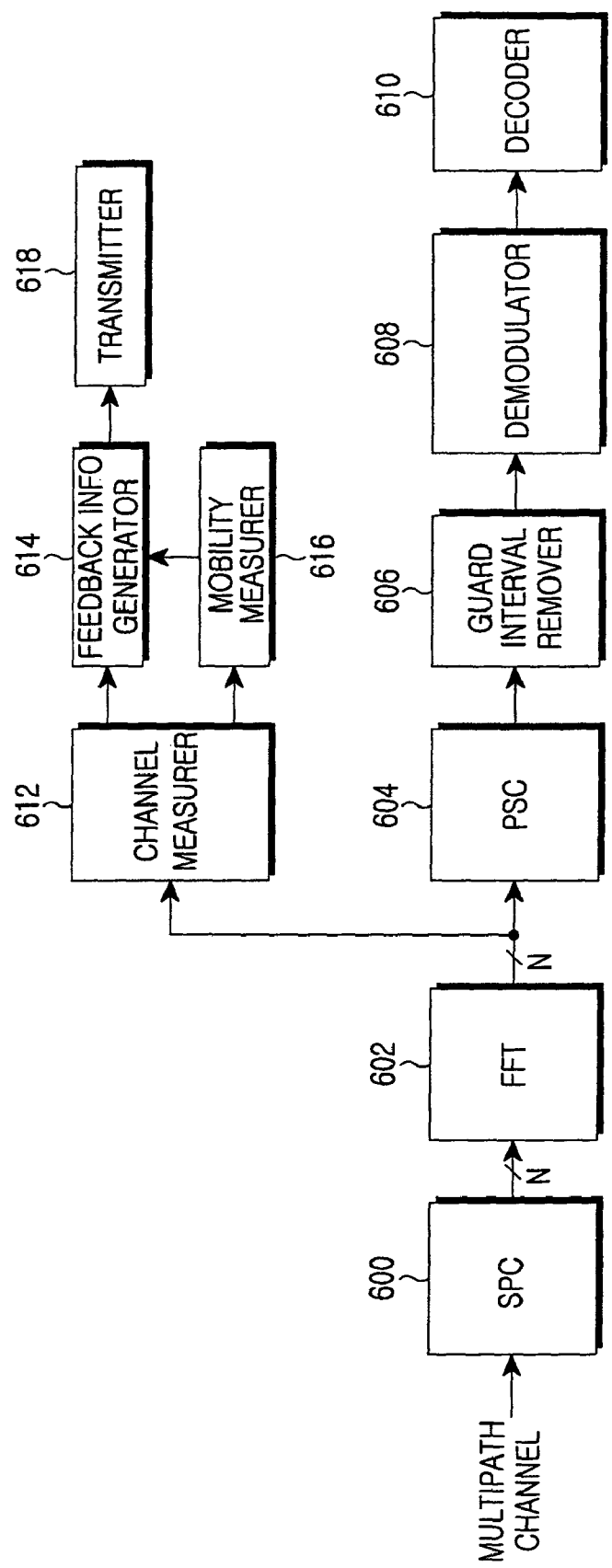
FIG. 6 is a diagram illustrating an exemplary structure of a UE transmitter for transmitting feedback information according to an exemplary embodiment of the present invention.

FIG. 6 illustrates a structure of an exemplary UE transmitter for transmitting feedback information according to an exemplary embodiment of the present invention.

Referring to FIG. 6, a serial-to-parallel converter (SPC) 600 converts an OFDM signal transmitted through a multi-path channel into N OFDM samples. An FFT block 602 performs FFT on the parallel N OFDM samples, and outputs N data symbols. A parallel-to-serial converter (PSC) 604 serial-converts the N modulation symbols, and outputs the serial-converted modulation symbols to a guard interval remover 606. The guard interval remover 606 removes a prefix or a suffix inserted to prevent intersymbol interference, from the serial-converted modulation symbol stream, and outputs the guard interval-removed modulation symbol stream to a demodulator 608. The demodulator 608 demodulates the data symbols output from the guard interval remover 606, and outputs the demodulated data symbols to a decoder 610. The decoder 610 decodes the demodulated data symbols into original data.

A channel measurer 612 measures the channel quality for each subcarrier/subband using N samples output from the FFT block 602. The channel measurer 612 determines P subcarriers/subbands with a lower SIR or subcarriers/subbands corresponding to the Null as a result of the channel measurement. Alternatively, the channel measurer 612 determines subcarriers/subbands with a higher SIR. The determined channel information is input to a feedback information generator 614. The feedback information generator 614 includes the channel information in feedback information. A mobility measurer 616 calculates mobility information of the UE. The mobility measurer 616 can indirectly measure mobility of the UE according to a comparison result between the previous channel information and the input channel information, or directly measure a moving velocity of the UE. The calculated moving velocity is included in the feedback information by the feedback information generator 614 and then transmitted to a base station by a transmitter 618.

In another example, the mobility measurer 616 calculates a Doppler value by comparing the previously estimated UE velocity with the current UE velocity. The estimated Doppler value or velocity difference is included in the feedback information by the feedback information generator 614 and then transmitted to the base station by the transmitter 618. The feedback information can further comprise channel information, such as CQI and Null/Peak for the subcarriers/subbands. The base station performs frequency allocation using the feedback information by taking the mobility of the UE into consideration.

Figure 7:
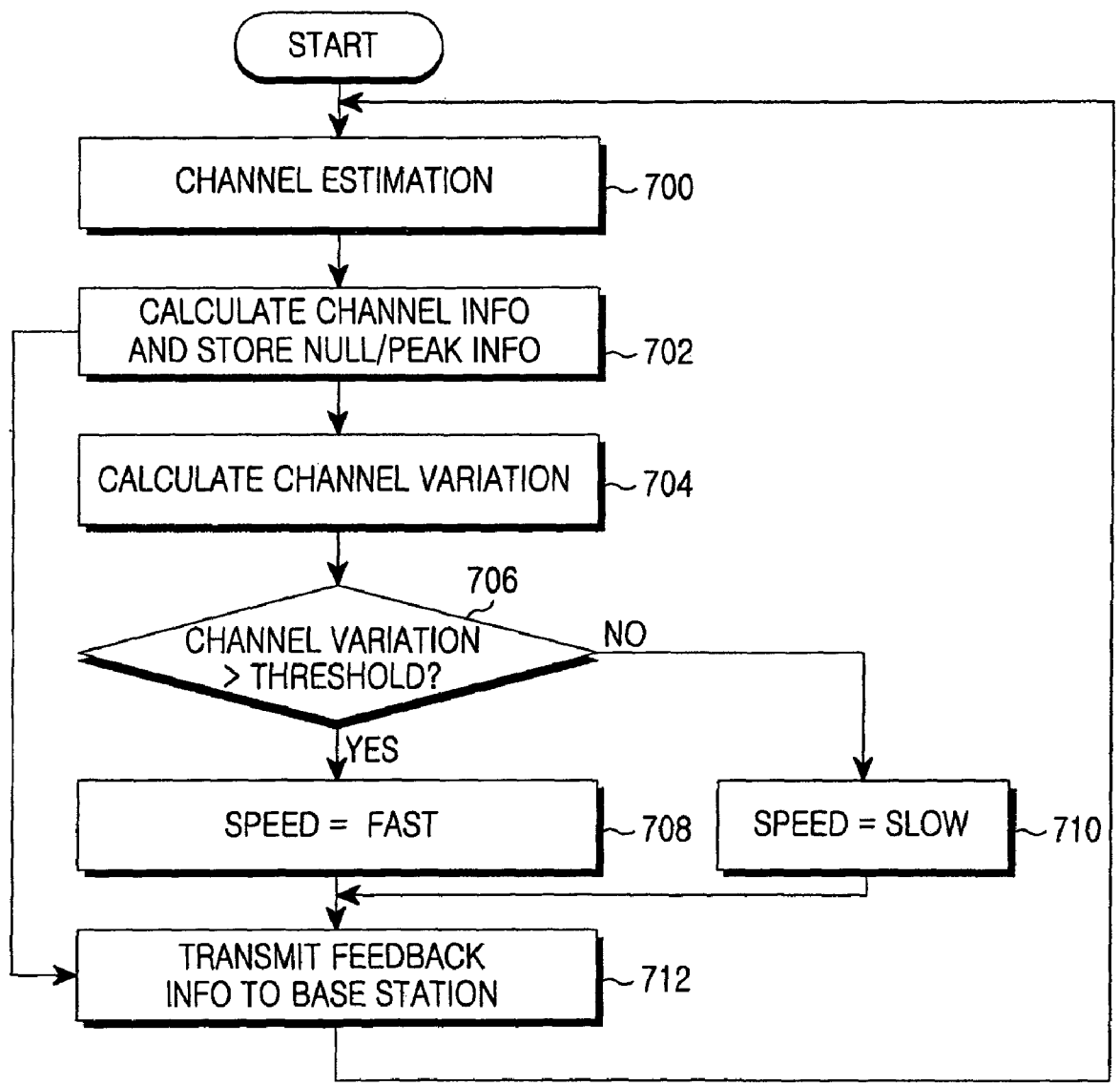
FIG. 7 is a flowchart illustrating an exemplary UE operation for transmitting feedback information according to an exemplary embodiment of the present invention.

FIG. 7 is a flowchart illustrating an exemplary UE operation of transmitting feedback information according to an exemplary embodiment of the present invention.

Referring to FIG. 7, in step 700, a UE receives OFDM signals transmitted from a base station, and measures channel quality for each subcarrier/subband. That is, the UE measures the channel quality for each of the subcarriers/subbands, and determines a subband for the Null or a subband for the Peak. In step 702, the UE stores the channel quality information.

In step 704, the UE calculates a channel variation due to the mobility of the UE by comparing the current channel quality with the previously measured channel quality. In step 706, the UE determines if the channel variation exceeds a predetermined threshold. If the channel variation exceeds the threshold, the UE proceeds to step 708. On the contrary, if the channel variation does not exceed the threshold, the UE proceeds to step 710. Proceeding to step 708 indicates that the UE moves at high speed within a predetermined cell or moves at high speed from a predetermined cell to another cell. Proceeding to step 710 indicates that the UE moves at low speed.

In step 712, the UE includes the channel variation information and the channel quality information in feedback information, and transmits the feedback information to the base station. The base station regards the channel variation as the mobility information of the UE.

For example, the feedback information transmitted from a UE moving at high speed of 30 Km/h or higher is received in an environment where the channel quality is subject to continuous change. Therefore, the base station cannot guarantee reliability for the feedback information continuously transmitted from the fast UE. When the feedback information is frequently transmitted from the fast UE, there is a signaling load between the base station and the UE particularly in an environment with low channel quality. Therefore, the fast UE transmits, to the base station, only the feedback information based on which the base station can detect the channel variation. That is, the fast UE includes only the mobility information indicating the channel variation, velocity and Doppler value of the UE in the feedback information before transmission.

Therefore, the fast UE can overcome interference such as intercarrier interference caused by fast channel variation using a method for allowing the base station to maximize frequency diversity. Upon receiving the feedback information with the mobility information, the base station allocates frequency resources based on the time-frequency mapping, STTD, SFTD, frequency hopping, or frequency interleaving, determining that the corresponding UE belongs to the fast UE group, i.e., determining that closed-loop frequency allocation using channel information is impossible.

On the contrary, the slow UE includes not only the mobility information such as channel variation, velocity or Doppler value of the UE, but also the channel information such as the Null/Peak information and the CQI information related to the sub-carrier/subband, in the feedback information before transmission. Upon receiving the feedback information comprising both the mobility information and the channel information, the base station allocates frequency resources based on the channel information using the closed-loop algorithm, determining that the corresponding UE belongs to the slow UE group. Therefore, the slow UE can be allocated frequency resources guaranteeing QoS from the base station, using a frequency scheduling scheme or a maximum carrier-to-interference ratio (C/I) selection scheme.

Figure 8:
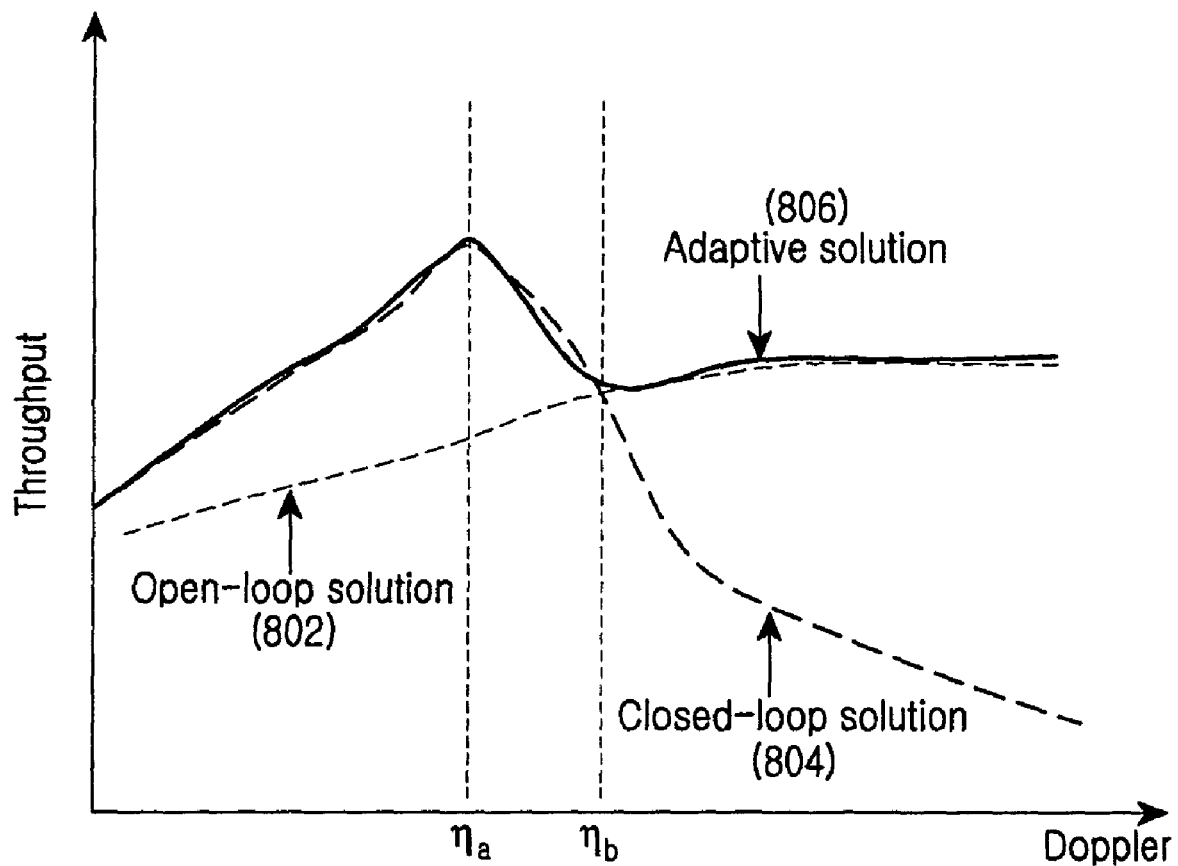
FIG. 8 is a diagram illustrating an exemplary throughput of a system for radio resource allocation according to an exemplary embodiment of the present invention.

FIG. 8 illustrates an exemplary throughput of a system for radio resource allocation according to an exemplary embodiment of the present invention. Herein, a comparison is made between the conventional open-loop/closed-loop solutions 802 and 804 in which the fast UE group and the slow UE group are not distinguished, and an adaptive solution 806 according to an exemplary embodiment of the present invention.

Referring to FIG. 8, because channel information is valid for a UE with a Doppler value of up to $\eta_a$, the closed-loop solution 804 is advantageous in terms of the system throughput. However, the feedback information is no longer effective for the UE, a Doppler value of which is greater than $\eta_b$. Therefore, the system throughput of the closed-loop solution 804 decreases little by little, beginning at the $\eta_b$.

On the contrary, the open-loop solution 802 smoothly responds to a change in Doppler value. However, an increase in the Doppler value increases the system throughput because of frequency diversity gain.

The adaptive solution 806 according to an exemplary embodiment of the present invention allocates frequencies according to the closed-loop solution 804 if a Doppler value of the UE is less than the predetermined threshold $\eta_a$. However, if the Doppler value is greater than the threshold $\eta_a$, the adaptive solution 806 allocates frequencies using the open-loop solution 802. Although the two thresholds are shown herein, it is also possible to use one threshold as described above. In this manner, the adaptive solution effectively allocates frequency resources by updating the frequency allocation taking mobility of the UE into consideration, thereby deteriorating the system throughput.

As can be understood from the foregoing description, the exemplary embodiments of the present invention allocate frequencies to the fast UEs and the slow UEs separately, before transmitting packet data. The exemplary embodiments of the present invention use a different frequency allocation algorithm according to the mobility of the UE, thereby improving the entire efficiency of the mobile communication system. In addition, the exemplary embodiments of the present invention allocate radio resources taking the mobility of the UE into consideration on a periodic basis, thereby satisfying QoS requirement.

While the invention has been shown and described with reference to exemplary embodiments thereof, it will be understood by those skilled in the art that various changes in form and details may be made therein without departing from the spirit and scope of the invention as defined by the appended claims.

What is claimed is:

1. A method for allocating, by a base station, a frequency resource to a user equipment (UE) in an orthogonal frequency division multiplexing (OFDM) mobile communication system, the method comprising the steps of
receiving feedback information comprising at least mobility information from the UE;
determining from the mobility information whether the UE belongs to a fast group or a slow group, allocating a frequency resource for the UE according to an open-loop solution if the UE belongs to the fast group, and allocating a frequency resource for the UE according to a closed-loop solution if the UE belongs to the slow group, determining a first frequency set indicating a frequency resource allocatable for the fast group in the full frequency band, and determining the remaining frequency resource except for the first frequency set as a second frequency set for indicating a frequency resource allocatable to the slow group; and
transmitting data for the UE using the allocated frequency resource,
wherein the mobility information represents one of a moving velocity and a Doppler value of the UE.

2. The method of claim 1, wherein the determining step comprises the step of:
determining time-frequency elements determined according to a time-frequency mapping technique as the first frequency set.

3. The method of claim 1, wherein the determining step comprises the step of:
dividing the full frequency band into one frequency band and the other frequency band into the ratio of the number of UEs belonging to the fast group to the number of UEs belonging to the slow group; and
determining the one frequency band and the other frequency band as the first frequency set and the second frequency set, respectively.

4. The method of claim 1, wherein the determining step comprises the step of determining the first frequency set such that subbands for the fast group are distributed over the full frequency band.

5. The method of claim 1, wherein the determining step comprises the step of:
dividing each of subbands constituting the full frequency band into two subcarrier sets in the ratio of the number of UEs belonging to the fast group to the number of UEs belonging to the slow group; and
determining the subcarrier sets as the first frequency set and the second frequency set.

6. The method of claim 1, wherein the allocation step comprises the step of:
allocating the frequency resource to the UE belonging to the fast group using Costas sequence-based time-frequency mapping, frequency hoping, space-time transmit diversity (STTD), space-frequency transmit diversity (SFTD), or frequency interleaving.

7. The method of claim 1, wherein the allocation step comprises the step of:
allocating the frequency resource to the UE belonging to the slow group according to channel information included in the feedback information using a frequency scheduling scheme or a maximum carrier-to-interference ratio (C/I) selection scheme.

8. A method for receiving an allocated frequency resource for receiving high-speed downlink packet data in an orthogonal frequency division multiplexing (OFDM) mobile communication system, the method comprising the steps of:
measuring channel quality per frequency using an OFDM signal received from a base station through multiple subcarrier channels;
measuring mobility of a user equipment (UE) that receives the OFDM signal;
determining whether the UE moves at high speed according to the measured mobility;
if the UE moves at high speed, including mobility information indicating the measured mobility in feedback information, and transmitting the feedback information to the base station;
if the UE does not move at high speed, including mobility information indicating the measured mobility and channel information indicating the channel quality in feedback information, and transmitting the feedback information to the base station; and
receiving data from the base station in an allocated frequency resource for the UE according to an open-loop solution if the UE moves at high speed, and receiving data from the base station in an allocated frequency resource for the UE according to a closed-loop solution if the UE does not move at high speed,
wherein the mobility information represents one of a moving velocity and a Doppler value of the UE, wherein the step of receiving comprises:
receiving the data in an allocated first frequency set indicating the frequency resource allocatable for the UE, which moves at high speed, in the full frequency band, if the base station determines that the UE moves at high speed according to the feedback information, or receiving the data in an allocated remaining frequency resource except for the first frequency set as a second frequency set, if the base station determines that the UE moves at slow speed according to the feedback information.

9. The method of claim 8, wherein the step of measuring mobility comprises the step of:
comparing the measured channel quality with a previously measured channel quality to calculate a channel variation:
determining that the UE moves at high speed if the channel variation is greater than or equal to a predetermined threshold; and
determining that the UE moves at low speed if the channel variation is less than the threshold.

10. The method of claim 8, wherein the channel information comprises channel quality indictor (CQI) information per frequency and Null/Peak information indicating null and peak frequencies.

11. A base station apparatus for allocating a frequency resource to a user equipment (UE) in an orthogonal frequency division multiplexing (OFDM) mobile communication system, the apparatus comprising:
a resource allocator for receiving feedback information comprising at least mobility information from the UE, determining from the mobility information whether the UE belongs to a fast group or a slow group, allocating a frequency resource for the UE according to an open-loop solution if the UE belongs to the fast group, allocating a frequency resource for the UE according to a closed-loop solution if the UE belongs to the slow group, and determining a mapping pattern indicating the allocated frequency resource; and
a transmitter for mapping data for the UE to the allocated frequency resource according to the mapping pattern provided from the resource allocator and transmitting the data for the UE, wherein the mobility information represents one of a moving velocity and a Doppler value of the UE, wherein the resource allocator determines a first frequency set indicating a frequency resource allocatable for the fast group in the full frequency band, and determines the remaining frequency resource except for the first frequency set as a second frequency set for indicating a frequency resource allocatable to the slow group.

12. The base station apparatus of claim 11, wherein the resource allocator determines time-frequency elements determined according to a time-frequency mapping technique as the first frequency set.

13. The base station apparatus of claim 11, wherein the resource allocator divides the full frequency band into one frequency band and the other frequency band in the ratio of the number of UEs belonging to the fast group to the number of UEs belonging to the slow group, and determines the one frequency band and the other frequency band as the first frequency set and the second frequency set, respectively.

14. The base station apparatus of claim 11, wherein the resource allocator determines the first frequency set such that subbands for the fast group are distributed over the full frequency band.

15. The base station apparatus of claim 11, wherein the resource allocator divides each of subbands constituting the full frequency band into two subcarrier sets in the ratio of the number of UEs belonging to the fast group to the number of UEs belonging to the slow group, and determines the subcarrier sets as the first frequency set and the second frequency set, respectively.

16. The base station apparatus of claim 11, wherein the resource allocator allocates the frequency resource to the UE belonging to the fast group using Costas sequence-based time-frequency mapping, frequency hoping, space-time transmit diversity (STTD), space-frequency transmit diversity (SFTD), or frequency interleaving.

17. The base station apparatus of claim 11, wherein the resource allocator allocates the frequency resource to the UE belonging to the slow group according to channel information included in the feedback information using a frequency scheduling scheme or a maximum carrier-to-interference ratio (C/I) selection scheme.

18. A user equipment (UE) apparatus for receiving an allocated frequency resource for receiving high-speed downlink packet data in an orthogonal frequency division multiplexing (OFDM) mobile communication system, the apparatus comprising:

a channel measurer for measuring channel quality per frequency using an OFDM signal received from a base station through a multipath channel;

a mobility measurer for measuring mobility of the UE;

a feedback information generator for determining whether the UE moves at high speed according to the measured mobility and for including mobility information indicating the measured mobility in feedback information if the UE moves at high speed; and including the mobility information and channel information in the feedback information if the UE does not move at high speed;

a transmitter for transmitting the feedback information to the base station; and a receiver for receiving data from the base station in an allocated frequency resource for the UE according to an open-loop solution if the UE moves at high speed, and receiving data from the base station in an allocated frequency resource for the UE according to a closed-loop solution if the UE does not move at high speed, wherein the mobility information represents one of a moving velocity and a Doppler value of the UE, wherein the receiver is for receiving the data in an allocated first frequency set indicating a frequency resource allocatable for the UE, which moves at high speed, in the full frequency band, if the base station determines that the UE moves at high speed according to the feedback information, or for receiving the data in an allocated remaining frequency resource except for the first frequency set as a second frequency set, if the base station determines that the UE moves at slow speed according to the feedback information.

19. The UE apparatus of claim 18, wherein the mobility measurer compares the measured channel quality with a previously measured channel quality to calculate a channel variation, determines that the UE moves at high speed if the channel variation is greater than or equal to a predetermined threshold, and determines that the UE moves at low speed if the channel variation is less than the threshold.

20. The UE apparatus of claim 18, wherein the channel information includes channel quality indictor (CQI) information per frequency and Null/Peak information indicating null and peak frequencies.

* * * * *